United States Patent
Zabel

[19]

[11] Patent Number: 5,949,404
[45] Date of Patent: Sep. 7, 1999

[54] JOY-STICK CONTROLLER

[75] Inventor: Klaus Zabel, Krefeld, Germany

[73] Assignee: Zabel Technik Gesellschaft Mit Beschrankter Haftung Herstellung und Vertrieb Elektromechanischer und Elektronischer, Bauelemente, Krefeld, Germany

[21] Appl. No.: 08/848,915

[22] Filed: May 1, 1997

[30] Foreign Application Priority Data

May 2, 1996 [DE] Germany .................. 296 07 920 U

[51] Int. Cl.⁶ ........................................ G09G 5/08
[52] U.S. Cl. ................. 345/161; 345/165; 345/166
[58] Field of Search ................... 345/161, 164–167; 250/22, 214; 341/13

[56] References Cited

U.S. PATENT DOCUMENTS

| | | | |
|---|---|---|---|
| 4,533,827 | 8/1985 | Fincher | 250/211 |
| 4,686,361 | 8/1987 | Bard | 250/221 |
| 4,731,530 | 3/1988 | Mikan | 250/229 |
| 4,748,323 | 5/1988 | Holiday | 250/221 |
| 4,982,189 | 1/1991 | Dammeyer | 341/13 |
| 5,103,225 | 4/1992 | Dolan | 341/13 |
| 5,252,821 | 10/1993 | Sugimura | 250/22 |

FOREIGN PATENT DOCUMENTS

| | | |
|---|---|---|
| 3405688 | 8/1985 | Germany . |
| 271603 | 9/1989 | Germany . |
| 4236228 | 4/1994 | Germany . |
| 9414207 | 12/1994 | Germany . |
| 02 266415 | 10/1989 | Japan . |

*Primary Examiner*—Richard A. Hjerpe
*Assistant Examiner*—Henry N. Tran
*Attorney, Agent, or Firm*—Herbert Dubno

[57] ABSTRACT

A controller has a stationary housing, a stem projecting from the housing along a stem axis, and a mount in the housing operatively engaging the stem and permitting same to tip relative to the housing about a center point in the housing generally traversed by the axis. An element carrying at least one emitter/receiver unit directs a beam generally radially of the center and another element carrying a field of interleaved reflective and less reflective regions is juxtaposed with the unit, spaced from the center, and impinged by the beam of the unit. One of the elements is fixed on the housing and the other of the elements is fixed on the stem so that on tipping of the stem about the center the beam is swept across the regions of the field.

8 Claims, 4 Drawing Sheets

JOY-STICK CONTROLLER

FIELD OF THE INVENTION

The present invention relates to a controller for a machine. More particularly this invention concerns a joy stick.

BACKGROUND OF THE INVENTION

For the control of various machines it has been found very convenient to provide a so-called joystick controller that basically comprises a stem that projects from a housing and that can be tipped in any direction about a center in the housing. Tipping forward and backward can control one function of the machine and from side to side another, and usually these functions are related to similar functions of the machine so that the joystick can be worked intuitively, for instance going up when pulled back, down when pushed forward, and right or left when tipped to the right or left.

In the simplest such system a series of contacts coacts with one or more wipers and, as the stem is tipped, the wiper or wipers travel across the contacts, emitting pulses that are processed by an appropriate circuit. Such systems have the advantage of simplicity but are also relatively failure prone. Any foreign matter that interferes with a perfect contact between the wiper and any of the contacts can make the device inoperative.

To avoid this problem with actual physical contacts, it is known to provide, for example, a magnet that can move relative to one or more coils. Such a system is much less sensitive to fouling, but presents problems in the interpretation of the signals received from the coil. As the magnet moves, the induced voltage varies in a manner that is not linearly related to the actual position of the stem, so that the coil output must be A processed in an often not fully exact manner to produce the desired position output.

When such a controller is used to operate a hydraulic or pneumatic machine, valves can actually be coupled to the stem to respond to its tipping. While such a system is extremely simple, it is only readily applicable to fluid-powered arrangements, and frequently has substantial lag in response as fairly long pilot lines must be provided between the controller and the equipment being controlled.

OBJECTS OF THE INVENTION

It is therefore an object of the present invention to provide an improved joystick-type controller.

Another object is the provision of such an improved joystick-type controller which overcomes the above-given disadvantages, that is which is extremely simple, reliable, and robust.

SUMMARY OF THE INVENTION

A controller has according to the invention a stationary housing, a stem projecting from the housing along a stem axis, and a mount in the housing operatively engaging the stem and permitting same to tip relative to the housing about a center point in the housing generally traversed by the axis. An element carrying at least one emitter/receiver unit directs a beam generally radially of the center and another element carrying a field of interleaved reflective and less reflective regions is juxtaposed with the unit, spaced from the center, and impinged by the beam of the unit. According to the invention one of the elements is fixed on the housing and the other of the elements is fixed on the stem so that on tipping of the stem about the center the beam is swept across the regions of the field.

Thus this system completely avoids any physical contact, avoiding the problems with contacts. The regions of the field can be arrayed so that, as the beam of the emitter/receiver is swept over the reflective and less reflective regions the receiver reacts to the reflected beam by producing pulses. The layout of the regions can be such that the pulses are generated in direct relationship to the amount of tipping of the stem, eliminating any necessity of complexly interpreting the unit output.

According to the invention the one element fixed on the housing is the element carrying the emitter/receiver unit, although it is of course possible for the system to be reversed with the field of reflective and nonreflective regions to be carried on the housing and the emitter/receiver units to be carried on the stem. For instance the field of regions could be formed on the outside of a ball fixed in the housing while the emitter/receiver unit orbits about the ball as the stem is tipped.

Normally in accordance with the invention the stem is formed with a shell having a part-spherical inner surface concentric with the center and carrying the field. The regions are strips extending in generally parallel planes at least one of which includes the center. The stem axis crosses the planes. Such a shell system provides excellent protection for the emitter/receiver units and a large surface area between the housing and stem so that the system is very rugged.

For maximum sensitivity, the housing carries at least two such emitter/receiver units whose beams are directed at about 90° to each other relative to the center. To further increase accuracy the housing carries four such emitter/receiver units.

In order to control a further function according to the invention a rod is provided extending along and rotatable in the stem about the axis and having an inner end inside the housing and an opposite outer end. Another emitter/receiver unit is carried on the inner end directed generally parallel to the axis, and another field of interleaved reflective and less reflective regions is provided on the element fixed to the stem and impinged by a beam from the other emitter/receiver unit. These regions of the other field extend radially of the axis. According to the invention a rotatable wheel projects from the stem and is operatively connected to the stem. Thus operation of this wheel produces another output that can be used independently of the output of the other emitter/receivers to control another function of the machine.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
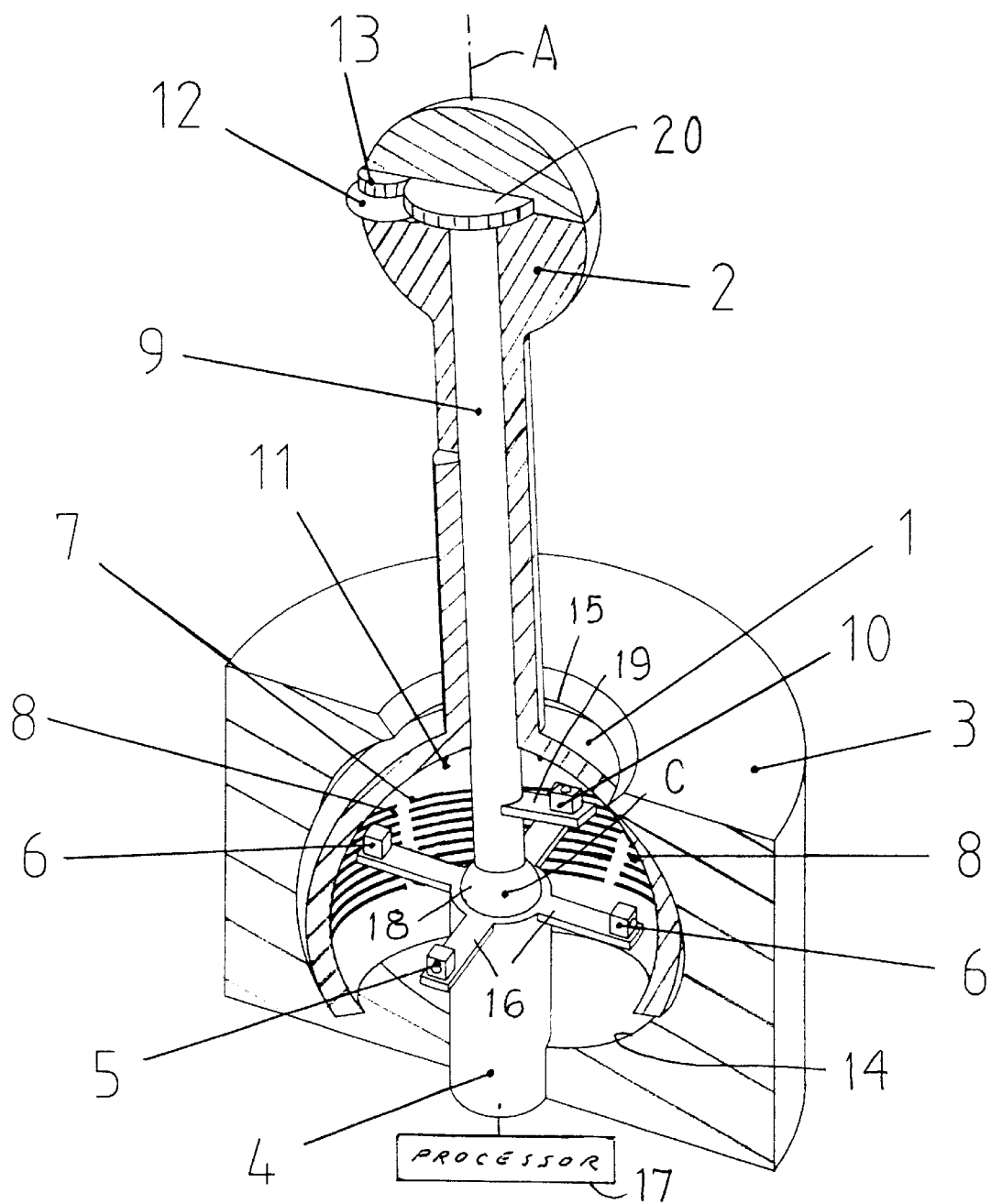
FIG. 1 is a perspective sectional view from above of the controller according to the invention.
Figure 2:
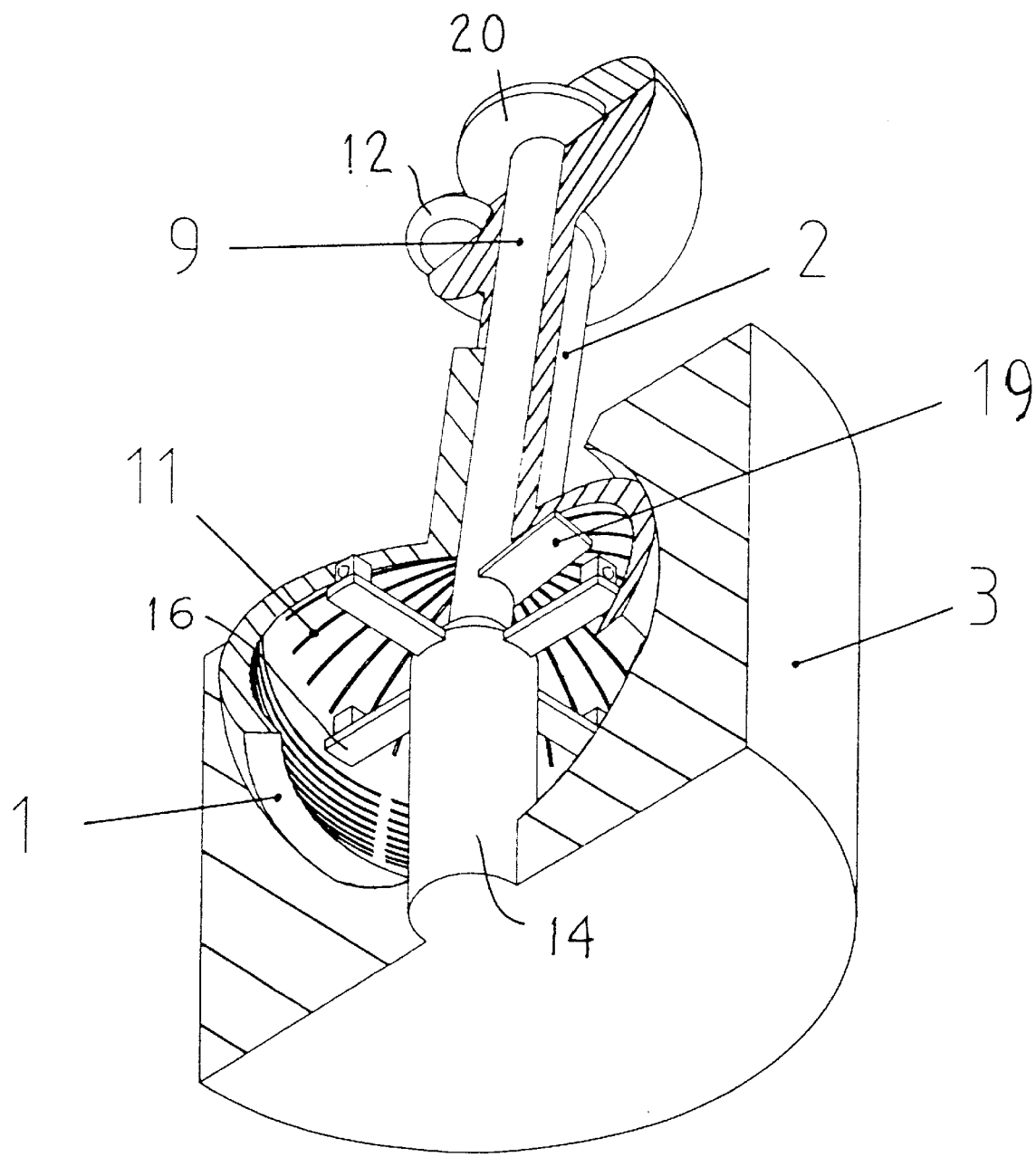
FIG. 2 is a perspective sectional view from below of the controller of FIG. 1.

As seen in FIGS. 1 and 2 a joystick controller according to this invention has a normally stationary housing 3 formed with a spherical cavity 14 concentrically holding a complementary spherical shell 1 carried on a stem 2 extending radially from the housing 3 through an opening 15 that allows the shell 2 to be tipped in all directions about a center C of the cavity 14. A rigid post 4 extending to the center C has four coplanar arms 16 extending equiangularly from the center C, that is at 90° intervals, on a level with the center C and each carrying a small emitter/receiver unit 5 or 6 directed radially outward from the center C. The units 5 and 6 normally each comprise a light source that emits a beam of reflectable light and a photocell directed parallel to the respective beam so that only when the emitted beam is reflected back does the respective photocell respond.

The spherical inside surface of the shell 1 is provided with arrays of reflective strips 7 alternating with non- or semi-reflective strips 8. Thus a light beam from one of the units 5 or 6 will either be reflected by one of the strips 7 back into the unit 5 or 6 or will be largely absorbed by one of the strips 8, depending on the angular position of the shell 1 within the cavity 14. The units 5 and 6 are connected to an electronic processor 17.

Thus as the stem 2 is tipped about the center C at least two of the units 5 or 6 will sweep their beams across the reflective and nonreflective strips 7 and 8 and the processor 17 will receive appropriately pulsed signals that accurately indicate the angular movement of the stem 2. Since the system has at least two such units 5 and 6 offset at 90° to each other relative to the center C of the cavity 14 and the axis of the stem 2, the processor can determine the exact angular change in position of the stem 2 in any direction. Furthermore since the fields 7 and 8 are arrayed uniformly based on the center C of the cavity 14, here extending in planes perpendicular to the axis A of the stem 2, rotation of the stem 2 about its axis A has no effect on the operation of the system. Thus it is not necessary to provide a special mount or linkage to inhibit such rotation, making the controller simpler and more reliable.

In addition according to this invention inside the stem 2, which is tubular, is a rod 9 having at its lower end a spherical ball 18 seated in a complementary socket in the post 4 and in fact serving as the pivot for the stem 2. This rod 9 can rotate about the axis A and carries on its lower end an arm 19 in turn carrying another emitter/receiver unit 10 that is not directed radially of the cavity center C but instead is directed parallel to the axis at strips 11 radiating from the axis A. A wheel 12 projecting slightly from the upper end of the stem 2 carries a gear 13 meshing with a gear 20 fixed on the end of the rod 9 so that this rod 9 can be rotated about the axis A independently of movement of the stem 2 about the cavity center C. Thus this wheel 12 can be rotated to feed another input into the processor to control yet another function, independently of the joystick position.

Figure 3:
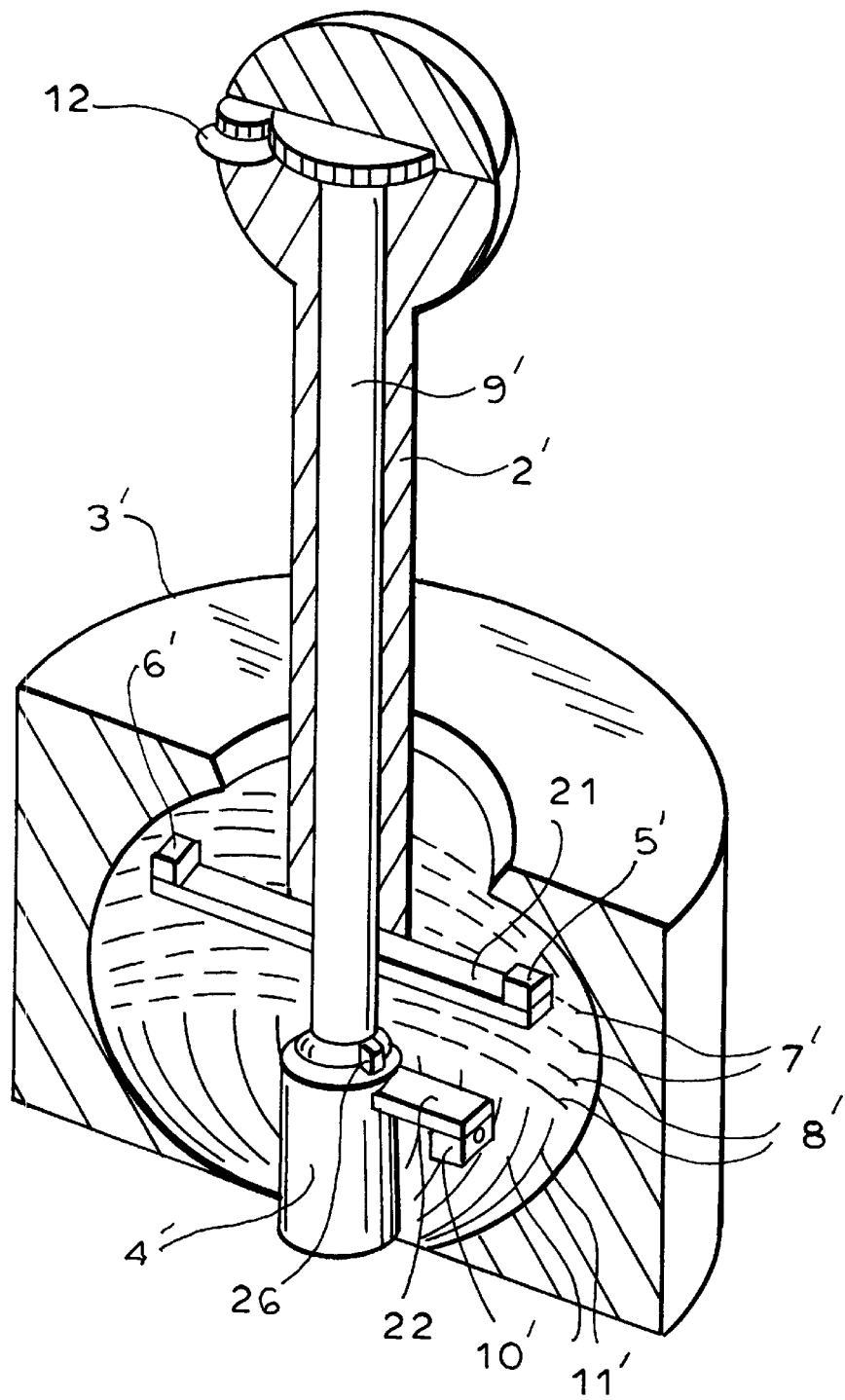
FIGS. 3 and 4 are perspective and partly sectional views of two further controllers according to the invention.

FIG. 3 shows another arrangement where the fields 7' and 8' are provided on a spherical inside surface of the housing 3' and the emitter/receiver units 5' and 6' are mounted on arms 21 projecting from the stem 2'. Similarly the auxiliary unit 10' is mounted on another arm 22 linked to the core rod 9' and the fields 11' are also on the housing 3'. This arrangement works identically to that of FIGS. 1 and 2.

Figure 4:
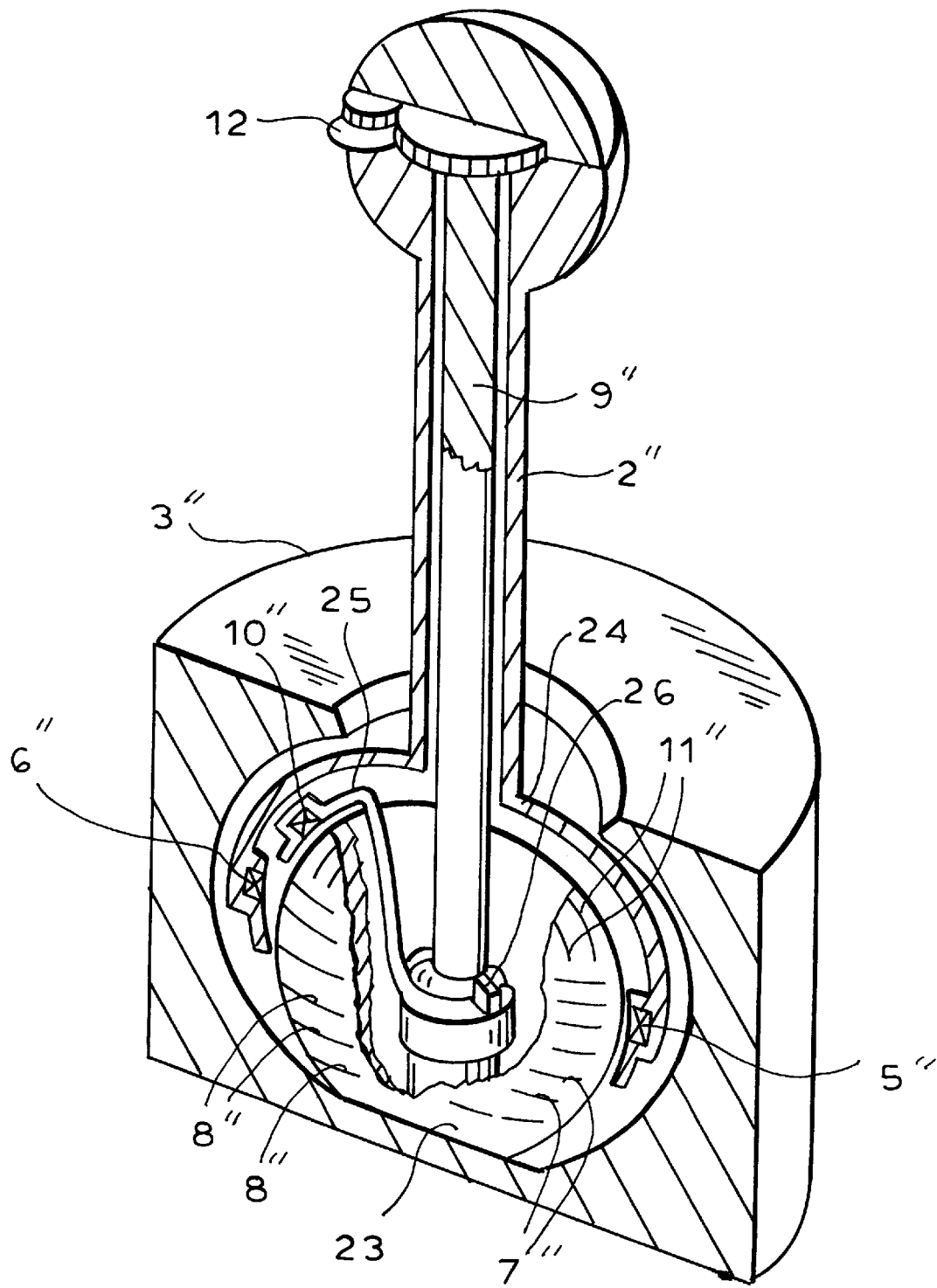

In FIG. 4 the reflective fields 7" and nonreflective fields 8" and the fields 11" are on a ball 23 fixedly mounted in the housing 3". The units 5" and 6" are mounted on a shell 24 fixed to the stem 2" and the unit 10" to another arm 25 fixed to the core rod 9". Thus the beams from the units 5" and 6" are directed radially inward at the ball 23 while that of the unit 10" is only generally parallel to the axis of the stem 2". This arrangement also functions the same as that of FIGS. 1 and 2.

I claim:

1. A controller comprising:
    a stationary housing;
    a stem projecting from the housing along a stem axis;
    a mount in the housing operatively engaging the stem and permitting same to tip relative to the housing about a center in the housing generally traversed by the axis;
    a shell fixed on the stem and having a downwardly concave part-spherical inner surface concentric with the center;
    at least one emitter/receiver unit fixed in the housing underneath the shell and directing a beam generally radially outwardly of the center; and
    a field of interleaved reflective and less reflective regions on the shell inner surface, juxtaposed with the unit, spaced from the center, and impinged by the beam of the unit, whereby on tipping of the stem about the center the beam is swept across the regions of the field.

2. The controller defined in claim 1 wherein the regions are strips extending in generally parallel planes at least one of which includes the center.

3. The controller defined in claim 2 wherein the stem axis crosses the planes.

4. The controller defined in claim 1 wherein the housing carries at least two such emitter/receiver units whose beams are directed at about 90° to each other relative to the center.

5. The controller defined in claim 4 wherein the housing carries four such emitter/receiver units.

6. The controller defined in claim 1, further comprising:
    a rod extending along and rotatable in the stem about the axis and having an inner end inside the housing and an opposite outer end;
    means on the stem for rotating the outer end;
    another emitter/receiver unit on the inner end directed generally parallel to the axis; and
    another field of interleaved reflective and less reflective regions on the shell and impinged by a beam from the other emitter/receiver unit.

7. The controller defined in claim 6 wherein the regions of the other field extend radially of the axis.

8. The controller defined in claim 6 wherein the means for rotating the outer end includes a rotatable wheel projecting from the stem and operatively connected to the stem.

* * * * *